United States Patent

[11] 3,617,561

[72] Inventor John R. Fanselow
 Kalamazoo, Mich.
[21] Appl. No. 838,335
[22] Filed July 1, 1969
[45] Patented Nov. 2, 1971
[73] Assignee Engelhard Minerals & Chemicals Corporation
 Woodbridge, N.J.

[54] METHOD FOR CLARIFYING LIQUIDS
 1 Claim, No Drawings

[52] U.S. Cl. .................................................... 210/47,
 210/53
[51] Int. Cl. .................................................. B01d 21/01
[50] Field of Search ........................................... 210/51–54

[56] References Cited
 UNITED STATES PATENTS

| | | | |
|---|---|---|---|
| 2,795,545 | 6/1957 | Gluesenkamp | 210/54 X |
| 2,981,630 | 4/1961 | Rowland | 210/54 X |
| 3,066,095 | 11/1962 | Hronas | 210/53 |
| 3,142,638 | 7/1964 | Blaisdell et al. | 210/53 X |
| 3,342,742 | 9/1967 | Cocks | 210/52 X |
| 3,477,565 | 11/1969 | Cecil et al. | 209/5 |
| 3,511,778 | 5/1970 | Libor et al. | 210/53 X |

OTHER REFERENCES

Thomas M. Riddick, Zeta Potential and Polymers Journal American Water Works Association, Vol. 58, No. 6, June, 1966, pp. 719–722

*Primary Examiner*—Reuben Friedman
*Assistant Examiner*—Thomas G. Wyse
*Attorneys*—Melvin C. Flint and Inez L. Moselle

ABSTRACT: An aqueous liquid containing suspended solids is clarified by a procedure in which attapulgite clay (preferably a concentrate of the attapulgite mineral content of such clay) is initially dispersed in the aqueous suspension. Before flocs form, there is incorporated an organic polymeric polyelectrolyte which interacts in situ with the deflocculated clay material to form flocs which occlude the matter that was originally suspended in the water. The clay material is preferably subjected to intensive mechanical work in the presence of water before it is added to the liquid to be clarified.

METHOD FOR CLARIFYING LIQUIDS

BACKGROUND OF THE INVENTION

U.S. Pat. No. 3,128,249 to David J. Pye et al. describes a method for clarifying water containing finely divided suspended solids. Wyoming bentonite or other clay composed predominantly of a mineral having the montmorillonite structure and a small amount of an acrylamide polymer are introduced into the water. Flocs comprising the bentonite (montmorillonite) clay and suspended solids form as a result. The flocs settle from the water and are separated by conventional treatments such as filtration or sedimentation.

A similar method is described in U.S. Pat. No. 3,066,095 to John J. Hronas. This method features the treatment of water containing suspended material with an inorganic coagulant such as alum, preferably before adding colloidal clay and any one of several types of organic polyelectrolytes. This patent also emphasizes the desirability of using a swelling bentonitic clay. U.S. Pat. Nos. 3,130,167 and 3,276,998, both to Jerome Green, describe similar treatments which utilize bentonite or saponite as the coagulating clay. According to the teachings of the prior art, exemplified by the patents mentioned above, the order of addition of the clay and polyelectrolyte is not critical. Generally, the substantially simultaneous addition of clay and polyelectrolyte is advocated.

Saponite clay and the so-called "bentonite" are members of the family of montmorillonite clays. Such clays are described by Ralph E. Grim in his text "CLAY MINERALOGY," McGraw-Hill Book Company, Inc. (1953) at pages 58 and 118. As described in the Grim text, the montmorillonite clays are characterized by a platy, layered structure.

In describing the function of the montmorillonitic clays as coagulating agents, the patents frequently refer to the formation of "hydrous flocs" as a result of the use of the clay in conjunction with organic polyelectrolytes. The clay is more specifically described as a "weighting agent" in an article by Ralph L. Carr, Jr. "POLYELECTROLYTE COAGULANT AIDS," W. & S. W.—Reference Number (1967) page R–66–72. In an article appearing in CHEMICAL & ENGINEERING NEWS, Jan. 15, 1968, page 46, the bentonite clay is said to "-make the flocs heavier."

THE INVENTION

An object of this invention is to provide an improved method for clarifying aqueous liquids with a combination of clay and organic polyelectrolyte, the method featuring the use of mineral material which is generally more effective or efficient than the same quantity of a montmorillonite clay would be.

I have discovered that the rate of floc formation, particle size of the flocs, rate of settling and the clarity of the supernatant liquid are significantly affected by the mineral species that is employed with an organic polyelectrolyte to clarify an aqueous liquid. I have found that a given quantity of a specific nonswelling clay mineral which is not a member of the montmorillonite family generally produces significantly better results when employed in a manner described hereinafter than may be realized with members of the montmorillonite clay group.

Briefly stated, in accordance with this invention, an aqueous liquid containing suspended solids is clarified by dispersing therein a deflocculated aqueous dispersion of acicular-hydrated attapulgite crystals, which crystals have never been thoroughly dried. Preferably, the aqueous clay dispersion is one that has been subjected to high-shear agitation. Before flocs form, there is incorporated an organic polyelectrolyte which reacts in situ with the originally dispersed acicular attapulgite crystals to form rapidly settling flocs which entrap the solids suspended in the liquid. The flocs are separated from the clarified supernatant by conventional means.

From this brief description of the invention it is apparent that an essential feature resides in the use of acicular attapulgite crystals. Ultrafine grinding which breaks down the individual crystals impairs the effectiveness of the mineral. Extensive drying also has an adverse effect.

Another feature is that the mineral is preferably incorporated in the suspension to be clarified in the form of an aqueous dispersion which has previously been subjected to intensive mechanical agitation. Unlike high-energy dry grinding of the mineral, this agitation has a very beneficial effect on the ability of the clay mineral to react with the organic polymer and form flocs.

Still another feature of the method of the present invention is that the aqueous dispersion of the clay and the organic polyelectrolyte are added separately to the suspension to be clarified, the organic polyelectrolyte being incorporated before floc formation takes place.

In accordance with a preferred embodiment of the invention, the mechanically worked (sheared) dispersion of attapulgite or attapulgite clay contains a small amount of an inorganic polyanionic sodium salt, preferably a sodium-condensed phosphate, as a deflocculating agent.

When an organic polyelectrolyte reacts with dispersed colloidal attapulgite crystals to form flocs, in accordance with my invention, the flocs are generally more voluminous, form more rapidly and settle more quickly than when any one of alum, organic polyelectrolyte or the clay material is used alone or when a swelling bentonite is substituted for the attapulgite or attapulgite clay. The conjoint use of attapulgite or attapulgite clay and organic polyelectrolyte results in more rapid and voluminous floc formation and in more effective clarification of the suspended particles since these particles are entrapped in the flocs. Thus, by practice of the principles of this invention clarification is more efficient and the capacity of a treatment plant may be increased. When economic or other considerations do not dictate improved capacity in a clarification plant, the principles of this invention may be used to realize an increase in the quantity of suspended solids that is removed from an aqueous suspension.

DETAILED DESCRIPTION

The invention is applicable to the clarification of water containing suspended minerals such as clay (e.g., surface waters) and insoluble carbonates or hydroxides (e.g. artesian waters). An important application is the removal of colloidally dispersed organic coloring matter such as the impurities which are present in swamp and bog waters. The treatment of waters containing colloidally dispersed coloring matter differs principally from the other treatments in that the removal or organic coloring matter requires pH control to a value below 7.0. Alum may be used to control the pH. Suspensions of inorganic solids may usually be clarified by the clay and organic polymer over a wide range of pH values, e.g., a pH within the range of about 3 to 10.

There is a correlation between the quantities of attapulgite and polymer added and the rate at which flocs form and the size and settling rate of the flocs. Increase in the concentrations of either one or both of these reagents generally increases the rate of floc formation and also increases the particle size and settling rate of the flocs.

Generally speaking, the attapulgite clay or attapulgite mineral is employed at a concentration within the range of 5 to 100 p.p.m. (expressed on the moisture-free weight of the clay material). Especially good results have been obtained when using the clay or mineral at a concentration within the range of 10 to 50 p.p.m.

The relative proportions of polymeric polyelectrolyte and clay or mineral vary with the concentration of clay or clay mineral, the polymer species and the nature of the liquid to be clarified. Economic considerations are also of significance since the organic polyelectrolytes are generally substantially more expensive than attapulgite clay or an attapulgite mineral concentrate from such clay. Generally the polymeric polyelectrolyte is employed at a concentration within the range of 0.01 to 2 p.p.m. When employing clay material at preferred concentrations within the range of 20 to 50 p.p.m., excellent results were realized with at least 0.05 p.p.m. polyanionic polymer. At clay concentrations within the range of 5 to 20 p.p.m. polymer concentrations of at least 0.2 p.p.m. produced satisfactory results.

The organic polyelectrolytes employed in carrying out this invention are synthetic water-soluble or water-dispersible high-molecular-weight organic polymers which form electrically charged organic ions distributed along the polymer chain when the polyelectrolyte is incorporated in water. Anionic polyelectrolytes, polyelectrolytes containing both anionic and nonionic groups and cationic polyelectrolytes may be used.

Anionic polymers contain a multiplicity of carboxylic groups distributed on the molecule. Examples are: acrylamide polymers, polyacrylic acid, sodium polyacrylate, sodium polymethacrylate, maleic anhydride-vinyl acetate, polyvinyl-methylether-maleic anhydride, methacrylic acid-methacrylamide, acrylic acid-styrene copolymer, polyvinyl acetate, sodium salt of styrene maleic anhydride, polyvinyl pyrolidone and itaconic acid-vinyl acetate. The acrylamide polymers encompass homopolymers of acrylamide and copolymers of acrylamide with up to about 15 percent by weight of an aliphatically unsaturated copolymerizable monomer such as acrylic acid, methacrylic acid, alkyl esters of the aforementioned, methacrylamide, styrene, vinyl acetate, acrylonitrile, methacrylonitrile, vinyl alkyl ether, vinyl chloride, vinylidene chloride. Especially recommended are water-soluble acrylamide polymers having a low degree of cross-linking between polymer chains such as the polymers described in U.S. Pat. No. 2,625,529 to Hedrick et al.

Cationic electrolytes are useful in clarifying suspensions of positively and negatively charged solids. Members of this class include, for example, the high molecular weight, water-soluble linear quaternary ammonium polymers described in U.S. Pat. No. 3,288,770 to Butler and exemplified by homopolymers of diallyldimethyl-ammonium chloride supplied under the trade name "Cat-Floc."

Attapulgite clay includes a mixture of the mineral attapulgite with smaller quantities of montmorillonite, calcite, ferruginous matter and quartz. Some properties and characteristics of attapulgite clay and the mineral attapulgite are described in the following patents and publications:

Grim, "APPLIED CLAY MINERALOGY," published by McGraw-Hill Book Company, Inc. (1962)

U.S. Pat. No. 3,080,214 — James B. Duke et al.

Raw attapulgite clay as mined may be employed in practicing the invention after the clay has been mixed with water to form a fluid suspension is preferably subjected to high-shear mechanical agitation in the presence of a deflocculating agent such as sodium silicate or a sodium Lcondensed phosphate salt. The clay may be mildly dried before it is incorporated with water and subjected to high-shear agitation. Dried attapulgite clay products, e.g., extruded pelleted products, should be dried at a product temperature below about 300° F. Drying should be insufficient to reduce the volatile matter of the clay below about 18 percent by weight.

The preparation of deflocculated aqueous dispersions of attapulgite clay (Attapulgus fullers earth) is described in U.S. Pat. No. 3,080,214 (supra). When the dispersion is prepared with a deflocculating agent, the raw clay-water suspension that is subjected to high-shear agitation may have a solids content up to about 28 percent by weight (calculated on the volatile-free or V.F. clay The terms "volatile-free clay weight," "volatile matter" and "free moisture" are defined in the Duke et al. patent. At solids contents above about 28 percent, slips of attapulgite clay may be too viscous to subject to high-shear agitation. Without a deflocculating agent, fluid suspensions of raw clay may contain up to about 5 percent clay solids (V.F. basis). It is preferable to remove coarse grit from the clay-water suspension before it is used to clarify waste liquids. Grit removal may be effected before or after high-shear agitation, preferably before. This may be accomplished by passing the suspension through screens of suitable dimensions, e.g., a 325-mesh Tyler screen.

High-shear agitation may be provided for example by colloid mills, a Waring Blendor, or by impeller agitators operating at high speed. Generally, high-shear agitation is characterized by the fact that the aqueous suspension increases substantially in temperature during the agitation. The mechanically worked deflocculated suspensions are characterized by the fact that the individual attapulgite clay crystals are separated from each other. The effectiveness of attapulgite clay or attapulgite as a clarifying agent is improved substantially by subjecting a deflocculated aqueous dispersion of the mineral material to high-shear agitation before the mineral suspension is incorporatd into the liquid to be clarified.

The preferred clay material is a mechanically worked deflocculated aqueous dispersion of a concentrate of the mineral attapulgite obtained by removing at least a substantial proportion of montmorillonite as well as quartz and other impurities from attapulgite clay. A method for forming a mechanically worked deflocculated aqueous concentrate of the mineral attapulgite from attapulgite clay is described in detail in the copending application of Tom A. CCecil et al., Ser. No. 640,313, now U.S. Pat. No. 3,477,565. Briefly, the process described in the Cecil et al. application involves mixing raw clay with water and a deflocculating agent, using sufficient water to form a fluid-concentrated system, subjecting the mixture to high-shear agitation, degritting the dispersion and maintaining the degritted dispersion under quiescent conditions until the mixture form a multiplicity of deflocculated strata, the strata differing in mineral content. A deflocculated montmorillonite-enriched strata and deflocculated attapulgite-enriched strata are separated from each other in order to provide the desired deflocculated aqueous concentrate of the mineral attapulgite. As produced by the procedure of the copending Cecil et al. application, the deflocculated mechanically worked attapulgite slip may contain up to about 10 percent solids (V.F. basis). This slip may be shipped in aqueous form for use in a water clarification plant. Alternatively, the slip may be mildly dried by spray drying, for example, to provide a predispersed solid attapulgite additive. The temperature and duration of drying should be carefully controlled to avoid reducing the volatile matter (V.M. of the mineral below about 18 percent. When using the predispersed microspheres, the microspheres should be incorporated into water, preferably with additional deflocculating agent, and the mixture to high-shear agitation before use in clarifying suspended solids.

Preferably the attapulgite concentrate has the lowest content of montmorillonite as possible. I have found, unexpectedly, that the montmorillonite component of attapulgite clay is significantly less effective for clarification purposes than the attapulgite component of such clay.

It has been brought out above that the aqueous suspension of the clay material preferably includes a deflocculating agent (dispersant) which may be incorporated during processing or subsequent to processing of the clay. Suitable deflocculating agents include sodium silicate, sodium hexametaphosphate, sodium tripolyphosphate, tetrasodium pyrophosphate, ammonium hydroxide, sodium hydroxide and mixtures thereof. The proportion of dispersing agent relative to clay or clay mineral varies with the species of dispersant and is generally within the range of about 0.5 to 5 percent of the V.F. weight of the clay material. The dispersant has a fluidizing agent effect on the clay-water system. Therefore, when a dispersant-effective proportion of a deflocculating agent is present, the clay-water system will have a lower viscosity than it would in the absence of the dispersant. For example, a 20 percent solids aqueous suspension of attapulgite clay would be a solid or semisolid mass in the absence of a strong deflocculating agent. With a suitable deflocculating agent, the suspension would be fluid and amenable to high-shear agitation.

It may desirable to add a supplementary quantity oF deflocculating agent to a predispersed aqueous suspension of the clay material in order to increase the fluidity of the suspension before the clay is incorporated with liquid to be clarified. For example, a small amount of sodium condensed phosphate (e.g., 0.5 to 2 percent of the weight of the mineral solids) may be added to a degritted deflocculated suspension of whole clay or to a deflocculated aqueous concentrate of the mineral attapulgite obtained by the quiescent settling of said suspension in accordance with the process described in the copending application of Cecil et al.

In putting the invention into practice, deflocculated aqueous dispersion of the clay material, preferably a mechanically worked dispersion, is incorporated in suitable proportion into the liquid containing suspended solids. The term "clay material" encompasses attapulgite clay including other clay minerals normally present in the raw clay as mined as well as pure attapulgite and attapulgite concentrates obtained by removal of grit and montmorillonite from whole clay. The clay dispersion should be thoroughly mixed with the liquid to be clarified.

The organic polymer must be incorporated in the liquid to be clarified before flocs appear. Preferably the polymer is incorporated as a dilute suspension or dispersion, e.g., at a concentration within the range of about 0.1 to 0.5 percent by weight. The addition of polymer should be followed by mild agitation in order to uniformly distribute the polymer in the aqueous system. Generally the clay material should be added before the organic polymer. In some cases it may be possible to incorporate a dispersion of organic polyelectrolyte into the suspension to be clarified before incorporating the clay dispersion without flocculation occuring before the clay dispersion is added. In such a case the organic polyelectrolyte may be incorporated before the clay. Similarly, with some systems it is possible to add a dispersion of polymer and a dispersion of clay material concurrently while mixing the liquid suspension. However, the organic polyelectrolyte cannot be premixed with the clay material before either one is incorporated in the liquid to be clarified because the clay and organic polyelectrolyte will interact prematurely, thus precluding occlusion of impurities in the flocs.

The liquid containing the clay material and organic polymer is maintained under quiescent or nonturbulent conditiOns until flocs form and settle. Conventional techniques such as thickening by decantation and filtration may be used to recover the clarified supernatant.

EXAMPLE I

The following tests were carried out to compare the effectiveness of a combination of organic anionic polyelectrolyte and various clay materials in clarifying a turbid aqueous suspension. The tests permitted a comparison of the rate of floc formation, the coarseness of flocs and rate of floc settling. These factors were generally closely related.

PREPARATION OF CLAY MATERIALS

The sample of Attapulgus clay employed in this example was a degritted clay obtained as follows.

An undried attapulgite clay crude from a mine near Attapulgus, Ga. was employed as the starting material. This crude contained a mixture of attapulgite, bentonite, with quartz and calcite as gangue minerals. The crude at about 50 percent V.M. was placed in a large Waring Blendor and was mixed with sufficient water to form a slip containing 24 percent solids (V.F. weight basis). Tetrasodium pyrophosphate was added in amount of 2 percent based on the V.F. clay weight and the Waring Blendor was operated for 5 minutes at low speed and then for 5 minutes at high speed. The resulting fluid deflocculated slip was degritted in a Tolhurst centrifuge. The degritted slurry of attapulgite clay (17 percent solids) was diluted to 3 percent solids (as determined by a hydrometer). This slurry was employed in tests to remove suspended solids, as described hereinafter.

The so-called "purified" or "enriched" attapulgite used in this example was recovered by processing a portion of the 17 percent slip of degritted Attapulgus clay in accordance with the procedure described in U.S. Pat. No. 3,477,565 to Tom A. Cecil et al. By this technique a montmorillonite enriched fraction was simultaneously recovered as a dilute deflocculated aqueous dispersion. The dispersion of montmorillonite was also tested in order to identify the constituent of the attapulgus clay that was responsible for its effectiveness in clarifying water.

All mineral additives were formed into dilute dispersions by adding 3 parts by weight mineral solids (or suspensions containing equivalent mineral solids) to 100 parts by weight of water having dissolved about 0.03 parts by weight sodium hexametaphosphate and shearing the mixture in a Waring Blendor at high speed for 3 minutes.

CLARIFICATION

The liquid to be clarified was a dilute (40 p.p.m.) suspension of kaolin clay in tap water.

In all tests, a predetermined quantity of the chemically deflocculated aqueous mineral dispersion was incorporated into the turbid suspension of kaolin clay. After addition of the mineral dispersion, the suspension was agitated until it appeared to be homogeneous. The suspension was then incorporated into an aqueous dispersion of polyacrylamide ("Separan NP10") of about 0.1 percent concentration. To provide mild mixing, the mixture was gently poured from one beaker to another at total of 10 times.

Clarification tests were carried out with mineral concentrations of 2.5, 5, 10, 20 and 40 p.p.m. At each of these mineral concentrations, "Separan NP10" was used at one eighth, one fourth, one half, 1 and 2 p.p.m. (At a mineral concentration of 2.5 p.p.m., the minimum "Separan" concentration tested was one half p.p.m.) In this manner the mineral and polyelectrolyte was tested in systems in which the products of the concentrations (p.p.m.) of the reactants ranged from one fourth to 80.

Floc formations were rated at each product concentration. The most effective mineral-polyacrylamide combination was defined as being the one in which the lowest product of the concentrations of mineral and polyacrylamide gave the best floc rating. Flocculation was rated by a letter using the following designations:

"A" — Floc became visible in less than 1 minute and settled a distance of 1 foot in 4 to 7 minutes.

"B" — Floc became visible between 1 to 2 mInutes and settled 1 foot in 10±3 minutes. Clear supernatant.

"C" — Floc became visible in about 5 minutes and settled 1 foot in 15±5 minutes. Clear supernatant.

"D" — Floc required 30±10 minutes to form and the flocs were of the "pinpoint" type, requiring 40 to 60 minutes to settle 1 foot. Usually a clear or slightly turbid supernatant.

"E" — Floc required 1 hour or more to form and usually left a turbid supernatant.

"F" — Flocs formed more slowly than "E", usually with minimal clarification.

A "D" floc was considered to be marginally satisfactory for the treatment of water intended for industrial or domestic consumption.

The formation of "B" or "C" floc in a system which was designed to process a given volume of water to provide a floc formation characterized as "D" would result in an increase in the capacity of the plant over design capacity without sacrificing the quality of the treated water. For example, a composition producing a "B" floc (about 10-minute settling time) would permit a five-fold increase over capacity obtained with a "D" floc (about 50-minutes settling time). A "C" floc with a 15 -minutes settling would increase capacity by a factor of about 3⅓ compared with the "D" floc. Since a "C"-type floc would represent an increase in plant capacity without sacrifice in the water clarity, the product concentrations which resulted in such a rating were also averaged. The smaller the value of the average the more effective the clarification. The relative amounts of mineral requIred to effect a given reduction in turbidity are generally approximately inversely proportionate to the activity ratings.

With the deflocculated, enriched attapulgite fraction from Attapulgus clay, "A" flocs were formed with the following combination of reactants: 40 p.p.m. mineral and one fourth to 2 p.p.m. "Separan"; 20 p.p.m. mineral and 1 to 2 p.p.m. "Separan" (i.e., at product concentrations as low as 10). "B" flocs were obtained with: 40 p.p.m. attapulgite concentrate and one-eighth to one-half p.p.m. "Separan"; and 10 p.p.m. attapulgite concentrate and one-half to 2 p.p.m. "Serapan." "C" flocs were obtained with 10 p.p.m. attapulgite concentrate and one-fourth or one-eighth p.p.m. "Separan" and with 5 p.p.m. attapulgite concentrate and one-half to 2 p.p.m. "Separan". At lower concentrations "D" or "E" flocs were obtained. The average of the product of concentrations of attapulgite and "Separan" to form "C" flocs (and thus realize improved plant capacity without sacrifice in clarity of the water) was found to be 4+. Thus, this product was rated 4+ by a rating system in which the smaller the rating number the more effective the mineral.

Generally, the most effective floc formation and reduction in turbidity was obtained with a ratio of from 40 to 100 parts by weight of attapulgite concentrate to 1 part by weight organic polyelectrolyte. Thus, "B" or "C" flocs were generally obtained at lower product concentrations than when the ratio of mineral to polymer was appreciably less than 40 to 1.

The degritted Attapulgus clay which contained naturally occuring bentonite in addition to attapulgite was found to be less effective than the attapulgite concentrate. In a series of nine tests, the average of the reactant concentrations to produce a "C" floc was 7. (With the attapulgite concentrate the corresponding value was 4+. As with the enriched attapulgite fraction, optimum ratios of mineral to organic polyelectrolyte were generally within the range of 40 to 100 to 1, respectively.

None of the bentonite or montmorillonites was as effective as the Attapulgus clay or attapulgite fraction from such clay.

Results are summarized in table I.

TABLE I

EFFECT OF MINERALS IN CLARIFYING AQUEOUS SUSPENSIONS

WHEN USED WITH POLYACRYLAMIDE

|  | Average of Product of Mineral Conc. (p.p.m.) Times "Separan" Conc. (p.p.m.) to Produce "C"-type Floc |
|---|---|
| Attapulgite fraction from Attapulgus clay | 4+ |
| Attapulgus clay | 7 |
| "Ben-A-Gel No. 1"* | 10 |
| Ben-A-Gel No. 2"* | 12 |
| Western bentonite | 12 |
| Southern bentonite | 21 |
| Montmorillonite fraction from Attapulgus clay | 23 |

* sodium bentonite thickening agents

Data in table 1 show that the Attapulgus clay was more effective than the best montmorillonite clays and that the attapulgite fraction of the Attapulgus clay was most effective. Data for the attapulgite and montmorillonite enriched fractions of Attapulgus clay indicate conclusively that the attapulgite mineral constituent of Attapulgus clay is responsible for the effectiveness of such clay as a clarification aid.

EXAMPLE II

This example demonstrates the necessity for controlling the drying of attapulgite and Attapulgus clay when the mineral is employed for clarification purposes with an organic polyelectrolyte.

A sample of the aqueous concentrate of the mineral attapulgite (example I) was carefully spray dried to produce a pRoduct containing more than 18 percent volatile matter. The spray dried product was mixed with water and sodium hexametaphosphate (1 percent of the "as is" mineral weight). The mixture was then sheared in the Waring Blendor and employed with a dilute dispersion of "Separan NP10X," as described in example I, to clarify a portion of the kaolin suspension. The product had an outstanding rating of 7.

In contrast, a sample of Attapulgus clay commercially used as in making up drilling mud had a rating of 17. This clay product has been processed by extruding raw Attapulgus clay into pellets, drying to a volatile matter below 18 percent, crushing and screening.

EXAMPLE III

Colloidal grades of Attapulgus clay in powdered form are used industrially to thicken various aqueous liquids. These products are obtained by fluid-energy-grinding colloidal grades of the clay using air or steam as the vehicle in which the particles are suspended while they are micronized by high-energy particle-to-particle impact. Samples of such powdered colloidal products were tested with "Separan NP10" as in example I. All rated above 20. The products were therefore substantially less effective than colloidal Attapulgus clay which had not been subjected to intensive mechanical work when in pulverulent condition.

The fluid energy ground Attapulgus clays were also less effective when employed with cationic polyelectrolytes ("Magnifloc 521" and "Primafloc C-7") and a nonionic polyelectrolyte ("Magnifloc 900N") than the degritted Attapulgus clay product used in example I. The fluid energy milled attapulgite clays were also less effective than the spray dried attapulgite concentrate described in example II.

Thus it has been shown that processed attapulgite clay and the mineral attapulgite were more effective than bentonitic (montmorillonite) clays in clarifying liquids. This result was unexpected in light of the prior art teaching of the desirability of using a swelling clay for clarification purposes since attapulgite is not a swelling clay. While not wishing to be bound to any theory of hypothesis as to the unusual effectiveness of attapulgite, experience indicates that when the mineral attapulgite is pretreated as described and employed in the prescribed manner it is significantly more reactive with organic polyelectrolytes than the layered minerals.

I claim:

1. In a process for clarifying an aqueous liquid containing inorganic suspended solids, the steps which comprise:

providing grit-free hydrated acicular attapulgite crystals which never have been dried to a volatile matter content below 18 percent and which never have been mechanically ground, using high-shear agitation, mixing said crystals in water in the presence of a deflocculating agent selected from the group consisting of sodium silicate, sodium hexametaphosphate, sodium tripolyphosphate, ammonium hydroxide, sodium hydroxide and mixtures thereof, thereby forming a fluid aqueous dispersion of said attapulgite crystals, incorporating said aqueous dispersion of hydrated attapulgite crystals with said liquid-containing suspended solids in amount sufficient to provide a concentration of said attapulgite crystals which is within the range of 5 to 100 p.p.m., forming a dilute aqueous dispersion of high-molecular weight anionic polyacrylamide, incorporating said dispersion of polyacrylamide into said mixture of aqueous liquid-containing suspended solids and previously incorporated sheared dispersion of attapulgite crystals, using a sufficient Camount of said dispersion of polyacrylamide to provide a polyacrylamide concentration within the range of 0.01 to 2 p.p.m., the relative concentration of polyacrylamide to attapulgite crystals being sufficient to form flocs in the mixture as a result of interactIon therebetween, allowing the resulting mixture to stand until flocs form, said flocs containing particles originally suspended in the liquid to be clarified,
and removing said flocs from the remainder.

* * * * *

UNITED STATES PATENT OFFICE
CERTIFICATE OF CORRECTION

Patent No. 3,617,561          Dated November 2, 1971

Inventor(s)  John R. Fanselow

It is certified that error appears in the above-identified patent and that said Letters Patent are hereby corrected as shown below:

Column 2 - line 48, "or" should read -- of --.

Column 3 - line 49, insert -- which -- after "suspension"; line 51, "sodiumLcondensed" should read -- sodium condensed --.

Column 4 - line 20, "Tom A. CCecil" should read -- Tom A. Cecil --; line 27, "form" should read -- forms --; line 40, insert a closing parenthesis -- ) -- after "V.M."; line 45, insert -- subjected -- after "mixture"; line 71, "oF" should read -- of --.

Column 5 - line 22, "uniform1Y" should read -- uniformly --; line 38, "conditiOns" should read -- conditions --.

Column 7 - line 75, "pRoduct" should read -- product --.

Column 8 - line 4, "Separan NP10X" should read -- Separan NP10 --; line 70, "Camount" should read -- amount --.

Signed and sealed this 9th day of May 1972.

(SEAL)
Attest:

EDWARD M. FLETCHER, JR.          ROBERT GOTTSCHALK
Attesting Officer                Commissioner of Patents